Dec. 20, 1932. J. J. LERAY 1,891,354
AIRPLANE
Filed Feb. 18, 1932 2 Sheets-Sheet 1

Inventor:
Joseph J. Leray

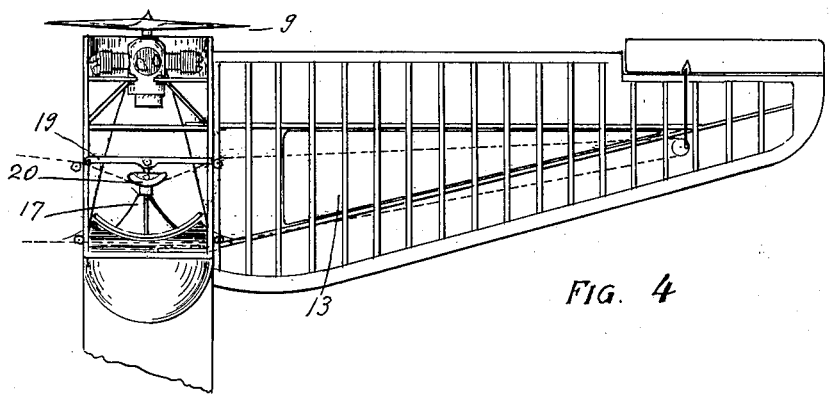
FIG. 4
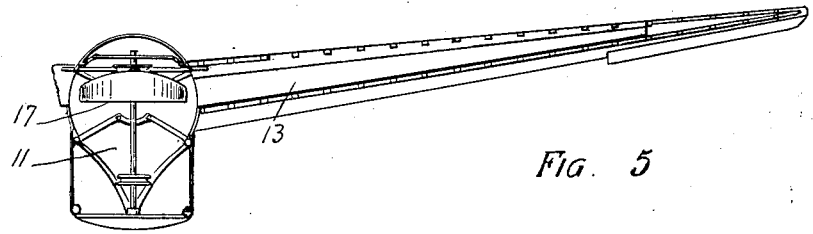
FIG. 5
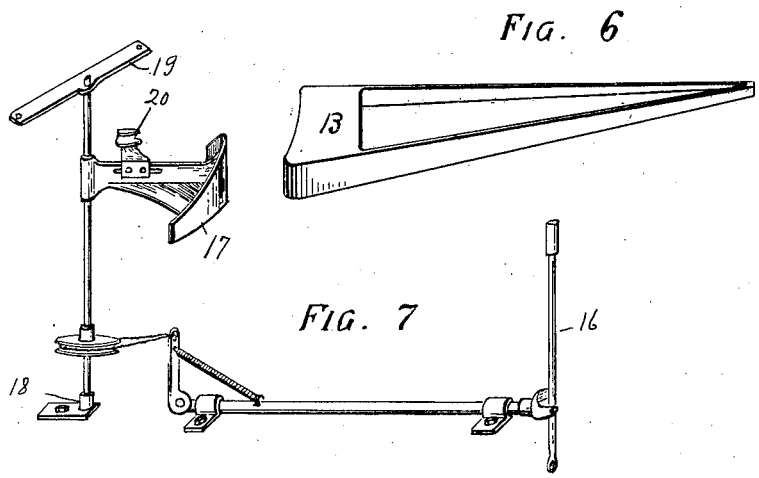
FIG. 6
FIG. 7
Inventor:
Joseph J. Leray

UNITED STATES PATENT OFFICE

JOSEPH J. LERAY, OF WEST WARWICK, RHODE ISLAND

AIRPLANE

Application filed February 18, 1932. Serial No. 593,795.

The invention relates to improvements in airplanes; the objects of the improvement are, first, to retard the burbling point of the air flow around a wing, second, develop a high suction lift by vacuum, and third, increase the efficiency of the lateral control specially at low speed.

Figure 1:
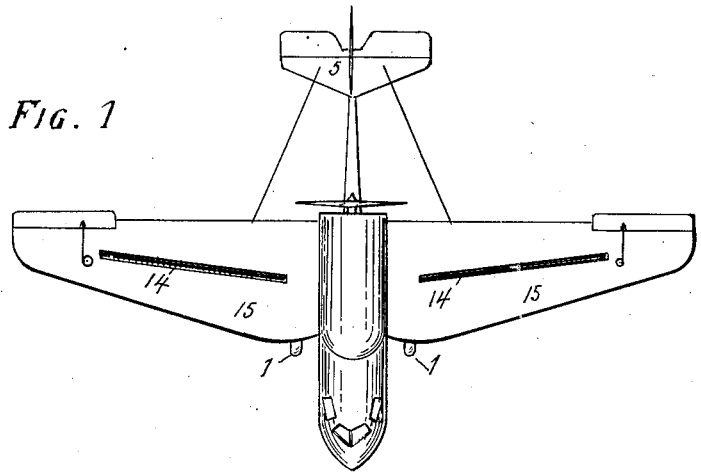
Figure 2:
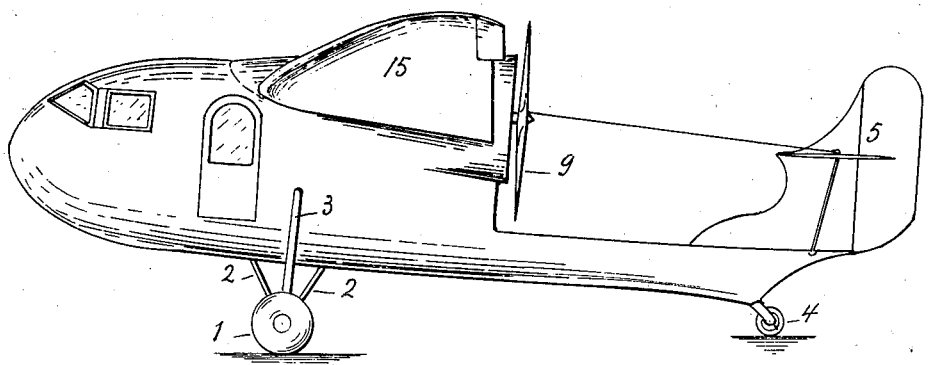
Figure 3:
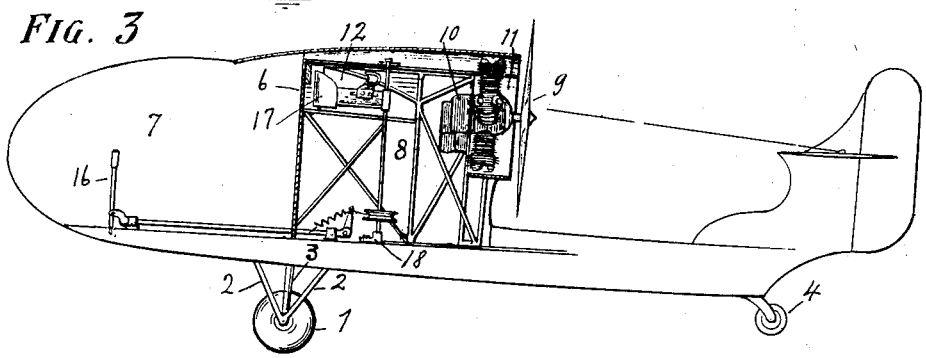

One form of the invention is illustrated in the accompanying drawings, in which Figure 1 is a plan view of the airplane, Figure 2 is a profile view of the same airplane, Figure 3 is a part of the vertical section along the longitudinal axis, Figure 4 is a plan view of one half the wing with top covering removed and part of the fuselage with the top cover or cowl removed, Figure 5 is vertical section along the lateral axis of the air chamber and half the wing, Figure 6 is a perspective view of one trough, Figure 7 is a detailed view in perspective of the air gate and its control attachment.

The landing gear comprising the wheels 1, axle 2, shock absorber struts 3 support the fuselage at one end and the tail wheel 4 supports the other end with the empennage 5. The fuselage is divided in two compartments by a fireproof partition 6, Fig. 3, of strong structure to which are attached the front spars. The front compartment 7 forms the cabin for the pilot and passengers; the rear compartment 8 forms an air chamber which terminates by a large circular opening 11 encircling completely the motor 10, and from which the air is exhausted out by the suction of the propeller 9.

The air chamber has two side openings 12, which fit tightly the root of the wing troughs 13, the root of the troughs being open, their connection with the fuselage establishes a continuous air passage from the wing to the air chamber as shown on Figs. 3 and 5.

The troughs 13 are built into the structure of the wing making an integral part of it. The covering of the wing goes over the troughs leaving two screened slots or long and narrow openings through which the air is sucked from the upper surface of the wing into the troughs, thence to the air chamber from which it is expelled out by the indraught of the propeller.

The internal air flow is regulated by a gate 17, shown on Figs. 3, 4, 5 and 7, pivoting at the bottom on a socket secured to the floor of the fuselage, and the top is pinned to a bar 19, allowing the gate to swing from side to side by the manipulation of the control stick 16, to which the gate is connected. The gate carries an adjustable horn 20 Fig. 7, to which the cables governing the ailerons are fastened, so the ailerons and gate work together simultaneously being interconnected. If the stick is tipped to the right, the gate swings to the right closing the right trough, and raising the right aileron, all contributing to depress the right side of the wing; the maneuver has, at the same time, increased the suction on the left side and the left aileron has gone down, both contributing to raise the left side of the wing. The regulation of the air flow increases the efficiency of the lateral control by affecting the uniformity of the suction lift, a great improvement for very slow flying speed. When the control stick is in neutral position the gate stands behind the fireproof partition leaving both troughs open as shown on Figs. 3, 4 and 5.

Past the air chamber up to the tail the fuselage is reduced to a narrow and slender structure by the extension of the two side bottom longérons and keel longéron united and braced together inside their covering, carrying at the end the empennage above and the tail wheel under, being of sufficient strength to care for the stress imposed on that structure in landing.

I claim:

The combination in an airplane having a fuselage, wings and ailerons thereon, a control stick for actuating the ailerons, and an engine driven pusher propeller mounted substantially at the rear of the wings, a circular housing cooperating with the fuselage and surrounding the engine and opening closely adjacent the front of said propeller, troughs communicating with said circular housing and located longitudinally of the wings, imbedded therein and communicating with screened slots in the upper surface of the wings, whereby air is drawn from the surface of said wings, due to the suction caused by the operation of said propeller, through said troughs and over said engine and out said circular housing, a swinging air gate connected to the control stick which in neutral position keeps the gate in center leaving the troughs from the wings open to communication with the housing and when to one side or the other the corresponding trough is discontinued from communication with the housing whereby a dual control is effected with the ailerons and air suction from the slots.

JOSEPH J. LERAY.